United States Patent
Howell et al.

(10) Patent No.: US 8,463,485 B2
(45) Date of Patent: Jun. 11, 2013

(54) PROCESS FOR SERVICE DIAGNOSTIC AND SERVICE PROCEDURES ENHANCEMENT

(75) Inventors: Mark N. Howell, Rochester Hills, MI (US); Mutasim A. Salman, Rochester Hills, MI (US); Xidong Tang, Sterling Heights, MI (US); Yilu Zhang, Northville, MI (US); Soumen De, Bangalore (IN); Sugato Chakrabarty, Bangalore (IN); Rahul Chougule, Bangalore (IN); Pulak Bandyopadhyay, Rochester Hills, MI (US); Steven W. Holland, St. Clair, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 323 days.

(21) Appl. No.: 12/943,261

(22) Filed: Nov. 10, 2010

(65) Prior Publication Data

US 2012/0116630 A1 May 10, 2012

(51) Int. Cl.
*G01M 17/00* (2006.01)
(52) U.S. Cl.
USPC .......... 701/29.4; 701/31.9; 340/438; 340/439
(58) Field of Classification Search
USPC ........... 701/29.4, 31.8, 31.9, 33.4; 340/425.5, 340/438, 439
See application file for complete search history.

(56) References Cited

U.S. PATENT DOCUMENTS

| | | | |
|---|---|---|---|
| 6,055,468 A | 4/2000 | Kaman et al. | |
| 6,212,449 B1 | 4/2001 | Wellman et al. | |
| 6,543,007 B1 | 4/2003 | Bliley et al. | |
| 6,959,235 B1 | 10/2005 | Abdel-Malek et al. | |
| 7,209,817 B2 | 4/2007 | Abdel-Malek et al. | |
| 2002/0059270 A1 | 5/2002 | Schlabach et al. | |
| 2002/0116246 A1 | 8/2002 | Wippersteg | |
| 2005/0131596 A1 | 6/2005 | Cherrington et al. | |
| 2005/0205720 A1 | 9/2005 | Peltz et al. | |
| 2006/0229777 A1 | 10/2006 | Hudson et al. | |
| 2007/0021966 A1 | 1/2007 | Ellefson et al. | |
| 2011/0137711 A1* | 6/2011 | Singh et al. .................. 705/7.38 |

* cited by examiner

*Primary Examiner* — Gertrude Arthur Jeanglaude

(57) ABSTRACT

A method is provided for enhancing service diagnostics utilizing service repair data of previously serviced vehicles. Service repair data of previously serviced vehicles is obtained from a memory storage device. The service data is compiled into a service diagnostic code dataset and a service labor code dataset. The service diagnostic code dataset and service labor code dataset are categorized into an electronic data table. Respective combinations are formed in the electronic data table. An aggregate count is determined for each respective combination in the electronic data table. Either of a respective diagnostic code or a respective service labor code is identified having a correlation with more than one of either service diagnostic codes or service labor codes. At least one of a service repair procedure used to repair the vehicle or a respective service diagnostic code used to identify the fault is modified in response to analyzing the respective combinations.

18 Claims, 2 Drawing Sheets

| | $LC_1$ | $LC_2$ | $LC_3$ | $LC_4$ | $LC_5$ | $LC_6$ | $LC_7$ | $LC_8$ |
|---|---|---|---|---|---|---|---|---|
| DTC $n_1$ | 15 | | | | 253 | | | |
| DTC $n_2$ | 3 | 5 | 15 | 125 | | | | |
| DTC $n_3$ | | | 260 | 222 | | | | |
| DTC $n_4$ | | 3 | 3 | 3 | | | | |
| DTC $n_5$ | | | 10 | 12 | 14 | | | |
| DTC $n_6$ | | | | | | 300 | | |
| DTC $n_7$ | | | | | | | 24 | |
| DTC $n_8$ | | | | | | 16 | | |

| | $LC_1$ | $LC_2$ | $LC_3$ | $LC_4$ | $LC_5$ | $LC_6$ | $LC_7$ | $LC_8$ |
|---|---|---|---|---|---|---|---|---|
| DTC $n_1$ | 15 | | | | | 253 | | |
| DTC $n_2$ | 3 | 5 | 15 | 125 | | | | |
| DTC $n_3$ | | | 260 | | 222 | | | |
| DTC $n_4$ | | 3 | 3 | 3 | | | | |
| DTC $n_5$ | | | 10 | 12 | 14 | | | |
| DTC $n_6$ | | | | | | | 300 | |
| DTC $n_7$ | | | | | | | | 24 |
| DTC $n_8$ | | | | | | | 16 | |

PROCESS FOR SERVICE DIAGNOSTIC AND SERVICE PROCEDURES ENHANCEMENT

BACKGROUND OF INVENTION

An embodiment relates generally to developing and enhancing service procedures and diagnostics.

Diagnostic faults codes (DTCs) are generated by an in-vehicle diagnostic processor for assisting a technician in identifying a problem with the vehicle. A DTC is a 5 digit alphanumeric code generated by the in-vehicle diagnostic processor when a problem is detected. When the in-vehicle diagnostic processor detects an error based on sensor inputs from one or more sensors, a diagnostic algorithm analyzes the sensed inputs and outputs a DTC as determined by the diagnostic algorithm. The DTC corresponds to a fault which can then be used to diagnose the problem. The DTC provides a starting point of where to diagnose the problem. In some instances there is only a specific component that can be the root cause of the problem. In other instances, the DTC is a fault where the root cause is not apparent. As a result, the DTC provides the technician the starting point for diagnosing and repairing the issue, but in many instances an initial assessment does not provide an actual root cause of the problem.

Service providers, such as a service department at a dealership, diagnose issues in the vehicle electronics with the aid of service diagnostic tools that utilize diagnostic software algorithms. Diagnostic trouble codes (DTCs) are set in the vehicle based on diagnostic software algorithms. The service diagnostic tools retrieves DTCs from a vehicle processor memory and are used to determine the fault in the vehicle. Each of the processors in the vehicle includes a memory that stores DTCs when the vehicle experiences a fault. The service technician can review the current or history of any triggered DTCs for assisting in determining the root cause in the vehicle. DTCs are alphanumeric codes that are used to identify a fault that occurs in various components within the vehicle. Such DTCs are related to various electrical vehicle functions that include, but are not limited to, engine operation, emissions, braking, powertrain, safety, and steering. Each subsystem may have its own on-board processor for monitoring faults of the subsystem operation or a centralized processor may be responsible for monitoring faults for a plurality of subsystems. When the subsystem processor detects a fault, one or more DTCs are generated.

The DTCs assist the service technician in pinpointing the area of concern. DTCs are retrieved by the service technician with the aid of a scan tool. Although the DTC provides assistance to the technician in pinpointing the area of concern, the DTC may not provide definitive information as to root cause. Usually, a DTC indicates a fault either in a specific component, a circuit connecting the component to a control module, or in a control module itself.

Labor codes are codes that are input by the service technician. The labor code includes a predefined description of a repair or action made to the vehicle relating to the part that is repaired. The labor code is typically demanded by the manufacturer of the equipment for warranty reporting purposes so that subject matter experts can analyze the data to determine how each repair was corrected.

For each respective DTC, there may be one or more labor codes that may be reported for the DTC. That is, the DTC only provides a fault and does not necessarily identify the component or system that needs repair or replacement. Therefore, multiple labor codes may be used if the problem requires multiple repairs, or possibly the technician made more than one repair when diagnosing the problem. As a result, analyzing reported DTCs and labor codes discretely provides some insight as to the details of how the technician diagnosed and repaired the problem; however, viewing each associated DTC and labor code individually fails to provide insight as to whether service procedures are incorrect, requires additional diagnostic steps, whether the DTC accurately depicts the problem, or whether the part component/system has design flaws.

SUMMARY OF INVENTION

An advantage of an embodiment is an identification of incorrect service repairs based on a compilation of data within a correlation electronic data table consisting of diagnostic trouble codes and labor codes obtained from a warranty storage database. Aggregate counts are determined based on the repair data reported by service repair facilities. More than one labor code reported for a single DTC indicates that repairs are being made in a non-efficient manner. Recommendations are made to further refine the service diagnostics for efficiently guiding a service repair technician through the analysis and diagnosis of the identified fault for reducing the number of repairs made to a vehicle for an identified fault and associated warranty costs.

An embodiment contemplates a method of enhancing service diagnostics utilizing service repair data of previously serviced vehicles. Service repair data of previously serviced vehicles is obtained from a memory storage device. The service data is compiled into a service diagnostic code dataset and a service labor code dataset utilizing a processor based device. The service diagnostic code dataset includes reported diagnostic trouble codes that identify a detected fault. The service labor code dataset includes reported repair codes used to repair the vehicle in response to the identified detected fault. The service diagnostic code dataset and service labor code dataset are categorized into an electronic data table utilizing the processor based device. Respective combinations are formed in the electronic data table between at least one respective service diagnostic code and at least one respective service labor code for each reported repair. An aggregate count is determined for each respective combination in the electronic data table. Either of a respective diagnostic code or a respective service labor code is identified that has a correlation with more than one of either service diagnostic codes or service labor codes. At least one of a service repair procedure used to repair the vehicle or a respective service diagnostic code used to identify the fault is modified in response to analyzing the respective combinations.

DETAILED DESCRIPTION

Figures 1, 2:
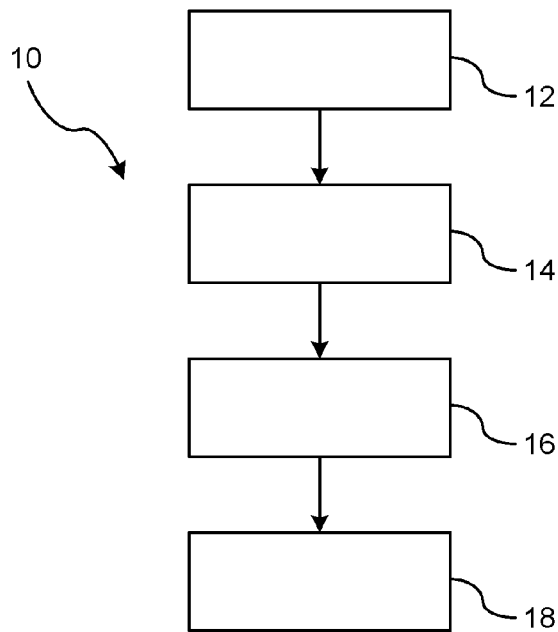
FIG. 1 is a block diagram of a diagnostic system for enhancing service diagnostics of a vehicle.
FIG. 2 is an exemplary correlation electronic data table.

There is shown in FIG. 1 an embodiment of a diagnostic system 10 for enhancing service diagnostics for a vehicle or any type of machinery utilizing service diagnostic codes and labor code warranty reporting. The diagnostic system 10 uses data mining tools for obtaining and compiling datasets from a warranty storage database 12. The warranty storage database 12 includes a memory storage unit which stores information relating a concern and a repair of the vehicle. The warranty storage database 12 preferably is a central database that receives and compiles service repair verbatims from all the service repair facilities servicing vehicles within a warranty reporting system. Typically, service facilities, such as vehicle dealerships, upon determining the cause of a problem submit database diagnostic trouble codes (DTCs) that represent the identified fault and the labor codes that represent the repairs that were made to the vehicle to the warranty storage database 12.

The DTC represents a diagnostic fault identified by diagnostic algorithms of the vehicle and provides a starting point of where to begin analyzing the fault. Service repair technicians utilize either service repair procedures or their own analytical skills or experience in diagnosing the problem based on the identified fault.

A reported labor code represents the service repair work performed by a service repair technician in repairing the vehicle. A vehicle in service for a repair may have more than one labor code reported to the warranty database system that is associated with the identified DTC. That is, some DTCs are very specific to the fault and there is only one repair that can be made for the identified fault, whereas other DTCs are general identifiers of the fault and provide only a starting point of where to begin analyzing the problem. The service repair procedure and service repair technician is relied on under these circumstances to determine the root cause of the problem. As a result, if the service repair technician does not correctly diagnose the fault, or if the repair service procedure does not accurately guide the service repair technician in identifying the fault, then various repairs may be made to the vehicle before the problem is correctly repaired. In such an instance, more than one labor code may be reported for a single DTC.

In addition, the service diagnostic algorithms may identify more than one DTC for a detected fault. In such a case, the service repair technician may utilize one or more service repair procedures until the problem is corrected. This results in one or more labor codes reported to the warranty storage database in response to the multiple DTCs enabled for the problem.

A compilation and categorization module 14 is provided for compiling service data when a query is made for a vehicle (i.e., vehicle make, model, and year) in which data mining is desired for enhancing the service diagnostics. The service data is compiled into a service diagnostic code dataset and a service labor code dataset. The compilation is performed by a processor based device such as a computer. The service diagnostic code dataset includes reported DTCs that identify faults detected by the vehicle diagnostic system of the serviced vehicles. The service labor code dataset includes reported labor codes reported by the service repair technician that identify the repair made to the vehicle based on the identified detected fault(s).

The compilation and categorization module 14 further categorizes the service diagnostic code dataset and the service labor code dataset into a correlation electronic data table, referred to hereinafter as matrix, that identifies all potential combinations of DTCs and labor codes. A respective matrix is generated for a respective vehicle (e.g., model, make, and year). Each matrix includes all DTCs categorized in the columns and all labor codes categorized in the rows. Alternatively, the DTCs may be disposed in the rows with the labor codes disposed in the columns.

A correlation matrix module 16 (shown in FIG. 2) identifies correlations between respective DTCs and labor codes for each reported service repair for the type of vehicle that is being analyzed. For each vehicle repair that was reported between a respective DTC and an associated labor code, a count will be maintained in the matrix for that respective combination. As a result, each respective combination of DTC and associated labor code will have a count identified in the matrix therein which represents an aggregate count as to the number of times a repair was made in which the DTC and labor code were reported together as part of a repair. It should be understood that not all respective combinations of DTCs and labor codes in the matrix will have a count since there may be no correlation between a respective DTC and a labor code in a reported repair. Therefore, the matrix may identify a single DTC in relation to a single labor code; a single DTC in relation to combinations of labor codes; combinations of DTCs in relation to single labor codes; combinations of DTCs in relation to combinations of labor codes.

Upon completion of the aggregate count for the respective combinations of the matrix, correlations within the matrix can be analyzed with defined procedures to determine how well a DTC isolates a respective fault. For example a large aggregate number between a respective DTC and a respective labor code with either none or a small aggregate number of other labor codes associated the respective DTC provides an indication that the labor code with the large aggregate number relating to the repair is the correct repair in servicing the problem. A low aggregate number between the respective DTC and other labor codes indicates that the wrong repair was made. In another example, for a respective DTC, if there is a wide distribution in the aggregate number of each of the various labor codes that have been reported with the respective DTC, then a determination may be made that there was not one unique solution to correcting the problem.

Referring again to FIG. 1, a recommendation module 18 analyzes the correlation of the DTCs and labor codes in light of their respective counts and provides a course of action to enhance either the service repair process or identifying the root cause. The following recommendations output by the recommendation module for identifying the root cause, may include, but are not limited to, an in depth review of how the service technicians solve the problem, change as to how a DTC is set on the vehicle which may generate a different repair response, change the labor code, enhanced training of service technicians, modify service procedures or work flow, provide service bulletins to service repair locations relating to the specific problem and repair, identify regional differences in the service repair locations where there is differences in how the repair is handled; recommend design changes is the vehicle system/subsystem/component; and identify further correlation with vehicle mileage.

Figure 3:
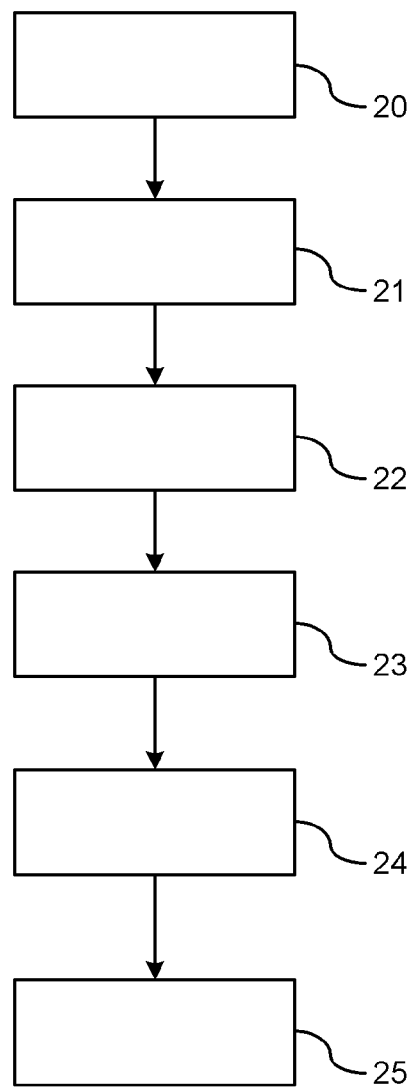
FIG. 3 flowchart of a method for enhancing service diagnostics of a vehicle.

FIG. 3 illustrates a flowchart of a method for enhancing service diagnostics of a vehicle. In step 20, vehicle service data is obtained from a warranty storage database. The vehicle service data queried from the vehicle storage database is directed at a specific model, make, and year of a vehicle. It should be understood that the process as described herein is described in terms of vehicle data, but may also be used for any type of machinery that requires servicing in which service diagnostic trouble codes and labor codes are obtained.

In step 21, service data is compiled based on the DTC dataset code and the labor dataset code. Each DTC reported for the queried vehicle and each labor code used listed as a repair for the queried vehicle is compiled.

In step 22, each DTC obtained by the warranty service database is listed in the matrix in a respective column. Each labor code obtained by the warranty service database is reported is listed in the matrix in a respective row. Alternatively, the labor codes may be disposed in columns and the DTCs may be disposed in rows.

In step 23, an aggregate number for each combination where a labor code was reported as a repair for an identified DTC in a vehicle repair is determined. That is, for a respective DTC and associated labor code, a count will be tallied as to how many times a repair associated with the labor code were performed on the queried vehicles. As result, each combination in the matrix where at least one repair was made for the labor code and DTC combination will generate a count. If a labor code is not associated as a repair for a respective DTC, then the count will remain zero or blank.

In step 24, combinations within the matrix having a count value will be analyzed for determining whether the repair process was efficient, or whether enhancements are required to the following analytical tools that include, but are not limited to, diagnostic algorithms, DTCs, labor codes, service repair procedures, or technician training, and communication. Analyzing the aggregate counts are determined by looking at the aggregate count of each combination for a DTC and determining whether more than one labor code was reported for the DTC. For example, if a labor code for a DTC exceeds a first predetermined threshold and the other labor codes associated with the DTC are below a second predetermined threshold, then a determination is made that the labor code exceeding the first predetermined threshold is the correct repair. Further evaluations may be determined as to how to minimize repairs relating to the other labor codes. In another example, if there is an even distribution between the aggregate counts of the labor codes and the associated DTC or a plurality of labor codes exceeds the first predetermined threshold, then the recommendation would be to review the service repair procedure as the current procedure does not efficiently identify the root cause. That is, the service procedure may lead the service technician to alternative paths based on the initial assessment obtained during the diagnosis/testing phase while servicing the vehicle. The following are various ways in which the data may be used to identify root cause warranty problems: For a new vehicle launch, design or system issues may result in unusually high correlations; for new vehicle subsystems, even distribution of the aggregate count among the plurality of labor codes may indicate how well service repair technicians detect and solve the problem or may indicate that the way in which the DTC is set on the vehicle should be changed thereby generating a different repair response; labor codes may require changing where there is confusion as to which labor code to choose from (i.e., repair done correctly but incorrect labor code entered); even distribution of the aggregate count may indicate that service repair technicians require extensive training; service bulletins sent out to centers identifying specific repairs that should not be made for a particular fault or how to correctly diagnose a particular fault; determination that respective repairs come from a regional area which may indicate incorrect servicing from the service personnel or that that the component is faulty in the environmental conditions of the region. Other recommendations may include, but are not limited to, design changes to the vehicle, system, subsystem, component, software, enhancement of service repair procedures, manuals, tools, and in-depth analysis of vehicles over a certain mileage.

In occurrences where there is a wide distribution of labor codes that are populated for a respective DTC, then a recommendation may be made to analyze a fleet level statistic to extract more information and identify whether this is a vehicle-make specific problem, a vehicle-model specific problem, or a vehicle-dealer specific problem (e.g., where a service tree is not adequate or not followed correctly). The following provides an example of how the DTC-labor code correlation and aggregate count can be computed from a fleet level perspective and narrowed accordingly to further isolate the root cause of a fault. A "Make" of a vehicle is listed in table 1 as follows:

TABLE 1

| Make | (LC1) <= DTC1, DTC2 |
|---|---|
| A | Test Statistics = X1 = f(counts, Arrival Rate, Mean, SD) |
| B | Test Statistics = X2 |
| C | Test Statistics = X3 |
| Statistical Test | Ho = X1 = X2 = X3 |
| | H1 = not(H0) |
| | If H0, then this is a common problem across the fleet |
| | If H1, go for segregation |
| Segregation Test | L1 < X1 < H1 –> mostly A problems |
| | L2 < X2 < H2 –> mostly B problems |
| | L3 < X3 < H3 –> mostly C problems |

Testing statistics followed by hypothesis testing will provide a first level analysis to identify whether the problem is directed to a fleet level problem (i.e., all vehicles made by the manufacturer) or a problem directed to a particular vehicle-make. If the statistical tests point to H1, then the assumption is that the issue is not a common problem across all vehicles and segregation among the vehicle fleet must be further analyzed. A next level of statistical tests relating to the vehicle "Model" is initiated as provided in Table 2.

TABLE 2

| Model | (LC1) <= DTC1, DTC2 |
|---|---|
| A1 | Test Statistics = Y1 = f(counts, Arrival Rate, Mean, SD) |
| A2 | Test Statistics = Y2 |
| A3 | Test Statistics = Y3 |
| Statistical Test | Ho = Y1 = Y2 = Y3 |
| | H1 = not(H0) |
| | If H0, then this is a common problem across the particular make |
| | If H1, go for segregation |
| Segregation Test | L1a < Y1 < H1 –> mostly A1 problems |
| | L2a < Y2 < H2 –> mostly A2 problems |
| | L3c < Y3 < H3 –> mostly A3 problems |

Testing will follow as to whether the problem emanates from a specific model (e.g., vehicle A models). If the problem comes from a specific model, then the next level of testing assesses whether this is occurring from a particular service repair provider or if this problem is common across all the service repair providers. The testing is initiated relating to the "Dealership" as provided in table 3.

TABLE 3

| Dealer | (LC1) <= DTC1, DTC2 |
|---|---|
| Dealer1 | Test Statistics = Z1 = f(counts, Arrival Rate, Mean, SD) |
| Dealer2 | Test Statistics = Z2 |
| Dealer3 | Test Statistics = Z3 |
| Statistical Test | Ho = Z1 = Z2 = Z3 |
| | H1 = not(H0) |
| | If H0, then this is a common problem across all dealers. The service procedure can be improved. |
| | If H1, go for segregation |
| Segregation Test | L1b < Z1 < H1b –> mostly Dealer1 specific |
| | L2b < Z2 < H2b –> mostly Dealer2 specific |
| | L3b < Z3 < H3c –> mostly Dealer2 specific |

Depending on whether this is a common problem or dealer specific problem, either the work flow can be modified if this is a specific service repair provider problem, or a modifications to the service procedure/manual may be determined if this is a common problem across all service repair providers. If the data collected grows in population then the data table may be updated based only on a proportion of the data. For example, it may be determined that maturity data for a population being analyzed may be representative of the group when a predetermined percentage (e.g., 25%-35%) of the entire population reaches the criteria for selection (e.g., mileage or age). Moreover, data may be collected as real-time data where only data that has been collected within a predetermined period of time is used for analysis.

If the failure data collected grows in population, then the data table may be required to be updated based only on a proportion of the data. That is, data maturity of the data is representative of the entire group when a percentage of the vehicle population reaches a predetermined age or mileage. As an example, it may be determined that maturity data for a population being analyzed may be representative of the group when a predetermined percentage (e.g., 25%-35%) of the entire population reaches the selected criteria (e.g., mileage or age). Moreover, data may be collected as real-time data where only data that has been collected within a predetermined period of time is used for analysis.

It should be understood that the tables or statistical tests as shown above can be converted into a decision tree where each entry indicates a potential repair decision. Decisions such as to whether a respective repair can address the entire fleet or whether specific make vehicles can be inferred and incorporated into repair/service database. Such decisions can be considered as probabilities of doing different repairs and converted to decision trees (e.g., Bayesian decision trees) that can be used to guide the service technicians to the correct repair.

The tables as shown above can also be used as indicators that point toward the appropriate case histories of previous repairs. Case base reasoning systems can use such information to determine a best repair with the potential of using the case base reasoning as a continuous repair process.

The tables as described above can further be narrowed using information such as engine specific data to further isolate the fault, vehicles over a respective mileage, and vehicles over a respective time in service (i.e., age of the vehicle). The table data can be automatically compiled as repairs are conducted with information being used to continuously adapt the diagnostic repair procedures.

In step 25, a corrective action is performed for modifying the service diagnostics that enhance the identification of a root cause of the fault. The corrective action may include, but is not limited to, modifying DTC codes, modifying the service repair technician training, modifying the service repair procedures.

While certain embodiments of the present invention have been described in detail, those familiar with the art to which this invention relates will recognize various alternative designs and embodiments for practicing the invention as defined by the following claims.

What is claimed is:

1. A method of enhancing service diagnostics utilizing service repair data of previously serviced vehicles, the method comprising the steps of:
   obtaining the service repair data of previously serviced vehicles from a memory storage device;
   compiling the service data into a service diagnostic code dataset and a service labor code dataset utilizing a processor based device, wherein the service diagnostic code dataset includes reported diagnostic trouble codes that identify a detected fault, wherein the service labor code dataset includes reported repair codes used to repair the vehicle in response to the identified detected fault;
   categorizing the service diagnostic code dataset and service labor code dataset into an electronic data table utilizing the processor based device, wherein respective combinations are formed in the electronic data table between at least one respective service diagnostic code and at least one respective service labor code for each reported repair;
   determining an aggregate count for each respective combination in the electronic data table;
   identifying either of a respective diagnostic code or a respective service labor code that has a correlation with more than one of either service diagnostic codes or service labor codes; and
   modifying at least one of a service repair procedure used to repair the vehicle or a respective service diagnostic code used to identify the fault in response to analyzing the respective combinations.

2. The method of claim 1 wherein the steps of compiling service data into a service diagnostic code dataset and a service labor code dataset includes compiling service data related only to a specific vehicle manufacturer.

3. The method of claim 2 wherein the steps of compiling service data into a service diagnostic code dataset and a service labor code dataset includes compiling service data related only to a specific model of vehicle.

4. The method of claim 3 wherein the steps of compiling service data into a service diagnostic code dataset and a service labor code dataset includes compiling service data related only to dealerships servicing the specific model of vehicle.

5. The method of claim 1 wherein analyzing respective combinations comprise the following steps:
   identifying a diagnostic trouble code that includes a combination having an aggregate count above a first predetermined threshold;
   identifying one or more combinations that include the diagnostic trouble code wherein the aggregate count is less than a second predetermined threshold; and
   performing a corrective action to prevent further repairs relating to a respective labor code for each combination that was determined to be less than the second predetermined threshold.

6. The method of claim 5 wherein analyzing respective combinations comprise the following steps:
   identifying combinations that include the diagnostic trouble code and respective labor codes wherein the aggregate count is evenly distributed between the identified combinations;
   refining the correlation electronic data table to evaluate one of either a class of vehicles or a group of dealerships;
   identifying a root cause of the fault in response to the aggregate counts of the refined correlation electronic data table; and
   performing a corrective action for modifying the service diagnostics to identify a root cause of the fault.

7. The method of claim 6 wherein the corrective action further includes modifying the DTC codes.

8. The method of claim 6 wherein the corrective action further includes modifying service repair procedures.

9. The method of claim 6 wherein the corrective action further includes enhancing service repair technician training.

10. The method of claim 6 further comprising the step of refining the electronic data table for compiling service data utilizing service data that relates only to a specific vehicle manufacturer.

11. The method of claim 6 further comprising the step of refining the electronic data table for compiling service data utilizing service data that relates only to a specific type of vehicle.

12. The method of claim 11 further comprising the step of refining the electronic data table for compiling service data utilizing service data that relates only to specific dealerships.

13. The method of claim 6 further comprising the step of refining the electronic data table for compiling service data utilizing service data that relates only to a specific type of vehicle engine.

14. The method of claim 13 further comprising the step of refining the electronic data table for compiling service data utilizing service data that relates to vehicles having a mileage over a predetermined mileage.

15. The method of claim 13 further comprising the step of refining the electronic data table for compiling service data utilizing service data that relates to vehicles over a predetermined age.

16. The method of claim 6 further comprising the step of refining the electronic data table for compiling service data utilizing service data that relates only to specific dealerships within a respective region.

17. The method of claim 6 further comprising the step of refining the electronic data table for compiling service data utilizing service data that relates only to vehicles over a predetermined mileage.

18. The method of claim 1 wherein the aggregate count is based on real-time service data collected within a predetermined period of time.

* * * * *